(12) United States Patent
Ali et al.

(10) Patent No.: US 11,928,510 B2
(45) Date of Patent: Mar. 12, 2024

(54) INCREASING PAGE SHARING ON NON-UNIFORM MEMORY ACCESS (NUMA)-ENABLED HOST SYSTEMS

(71) Applicant: VMware LLC, Palo Alto, CA (US)

(72) Inventors: Qasim Ali, Santa Clara, CA (US); Arunachalam Ramanathan, Union City, CA (US); Rajesh Venkatasubramanian, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 381 days.

(21) Appl. No.: 17/324,447

(22) Filed: May 19, 2021

(65) Prior Publication Data

US 2022/0374269 A1 Nov. 24, 2022

(51) Int. Cl.
G06F 9/455 (2018.01)
G06F 9/50 (2006.01)
G06F 12/0882 (2016.01)
G06F 12/1009 (2016.01)

(52) U.S. Cl.
CPC ........ *G06F 9/5016* (2013.01); *G06F 9/45558* (2013.01); *G06F 9/5077* (2013.01); *G06F 12/0882* (2013.01); *G06F 12/1009* (2013.01); *G06F 2009/45583* (2013.01); *G06F 2009/45595* (2013.01); *G06F 2212/2542* (2013.01)

(58) Field of Classification Search
CPC .. G06F 9/5016; G06F 9/45558; G06F 9/5077; G06F 12/0882; G06F 12/1009; G06F 2009/45583; G06F 2009/45595; G06F 2212/2542
See application file for complete search history.

(56) References Cited

U.S. PATENT DOCUMENTS

| | | | |
|---|---|---|---|
| 9,465,642 B1* | 10/2016 | Naik | G06F 3/0619 |
| 2015/0277779 A1* | 10/2015 | Devarapalli | G06F 9/45558 |
| | | | 711/162 |
| 2016/0085571 A1* | 3/2016 | Kim | G06F 9/48 |
| | | | 718/1 |
| 2018/0004555 A1* | 1/2018 | Ramanathan | G06F 9/45558 |
| 2018/0060104 A1* | 3/2018 | Tarasuk-Levin | G06F 9/4856 |
| 2019/0042330 A1* | 2/2019 | Duarte Cardoso | G06F 1/206 |
| 2019/0056890 A1* | 2/2019 | Wookey | G06F 9/45558 |
| 2021/0263858 A1* | 8/2021 | Kaul | G06F 12/1018 |
| 2022/0214825 A1* | 7/2022 | Ganguly | G06F 12/126 |

OTHER PUBLICATIONS

Ming Liu, Optimizing Virtual Machine Consolidation Performance on NUMA Server Architecture for Cloud Workloads, IEEE, 2014 (Year: 2014).*
Vmware, Best Practices for Published Applications and Desktops in Vmware Horizon Apps and Vmware Horizon 7, Jul. 2017 (Year: 2017).*

* cited by examiner

*Primary Examiner* — Dong U Kim
(74) *Attorney, Agent, or Firm* — Quarles & Brady LLP

(57) ABSTRACT

In one set of embodiments, a hypervisor of a host system can determine that a delta between local and remote memory access latencies for each of a subset of NUMA nodes of the host system is less than a threshold. In response, the hypervisor can enable page sharing across the subset of NUMA nodes, where enabling page sharing comprises associating the subset of NUMA nodes with a single page sharing table, and where the single page sharing table holds entries identifying host physical memory pages of the host system that are shared by virtual machines (VMs) placed on the subset of NUMA nodes.

21 Claims, 6 Drawing Sheets

INCREASING PAGE SHARING ON NON-UNIFORM MEMORY ACCESS (NUMA)-ENABLED HOST SYSTEMS

BACKGROUND

Unless otherwise indicated, the subject matter described in this section is not prior art to the claims of the present application and is not admitted as being prior art by inclusion in this section.

Instant cloning is a technology that enables a virtual machine (VM), referred to as an instant clone, to be quickly created on a host system from another (i.e., parent) VM running on that same host system. Typically, the instant clone shares the memory of the parent VM at the time of its creation, which means the guest physical memory pages (i.e., physical page numbers or PPNs) of the instant clone are mapped to the same host physical memory pages (i.e., machine page numbers or MPNs) of the host system as the PPNs of the parent VM. Information regarding these shared MPNs is maintained by a hypervisor of the host system in a metadata structure known as a page sharing hash table. As the instant clone makes changes to the data in its guest memory, the hypervisor writes the changes to newly allocated MPNs, remaps the instant clone's affected PPNs to the newly allocated MPNs (thereby breaking the sharing of the previously mapped MPNs), and updates the page sharing hash table to reflect the new mappings.

A non-uniform memory access (NUMA)-enabled host system is a host system that is composed of multiple NUMA nodes, where each NUMA node is a logical grouping of a physical compute resource and an associated physical memory, such as a central processing unit (CPU) socket and a dynamic random access memory (DRAM) directly attached to that CPU socket. As alluded to by the "NUMA" qualifier, the compute resource of a NUMA node is able to access its local memory (i.e., the physical memory of the NUMA node) faster than remote memories (i.e., the physical memories of other NUMA nodes). To promote memory locality, existing hypervisors that support NUMA generally (1) place a VM on a single NUMA node (referred to as the VM's home node) at the time of the VM's creation, thereby constraining the VM's virtual CPU(s) to running on that node's compute resource, and (2) disable MPN sharing (hereinafter referred to as page sharing) across NUMA nodes, because accessing remote memory is costly. Condition (2) is typically achieved by associating each NUMA node with a separate page sharing hash table that can only include MPNs local to that NUMA node (or in other words, MPNs which reside in the physical memory of that NUMA node), thereby preventing VMs from sharing MPNs residing in remote memories.

One issue with disabling cross-node page sharing is that, in the context of instant cloning, an instant clone may be created and placed on a NUMA node that is different from the home node of the instant clone's parent VM. In this situation, the instant clone cannot share MPNs with its parent VM in accordance with the typical instant cloning workflow because of condition (2) above. As a result, there will be a loss of page sharing and the entirety of the guest memory content of the parent VM will be copied from the parent VM's home node to the instant clone's home node. If this copying is repeated for many instant clones, it can lead to a significant increase in host physical memory consumption and consequent problems such as poor VM performance, reduced memory overcommitment capacity, and reduced VM density.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure describes various approaches for increasing the degree of page sharing on a NUMA-enabled host system, particularly in scenarios where a parent VM is created/placed on a first NUMA node of the host system and one or more instant clones of the parent VM are created/placed on a second NUMA node of the host system that is different from the first NUMA node.

With these approaches, the need to create a separate copy of the parent VM's guest memory content for every instant clone of the parent VM on the second NUMA node can be largely avoided, resulting in reduced host physical memory usage and the ability to achieve higher levels of memory over-commitment, VM density, and VM performance.

2. Example Host System and High-Level Solution Descriptions

Figure 1A:
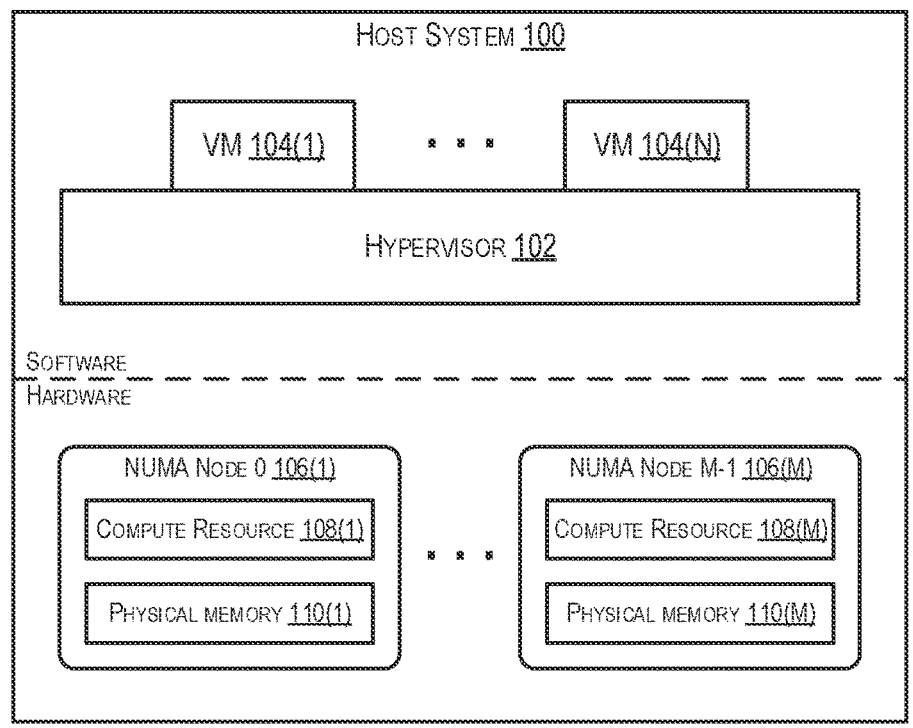
FIGS. 1A and 1B depict an example NUMA-enabled host system.
Figure 1B:
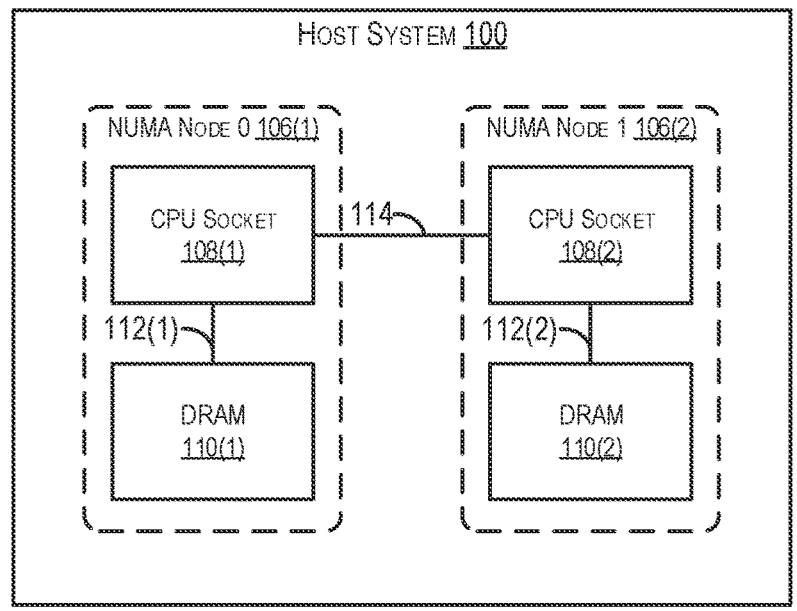

FIGS. 1A and 1B are simplified block diagrams of an example NUMA-enabled host system 100 in which embodiments of the present disclosure may be implemented. As shown in FIG. 1A, host system 100 includes a hypervisor 102 and a number of VMs 104(1)-(N), as well as a number of NUMA nodes 106(1)-(M) identified via indices 0 to M−1. Each NUMA node 106 is a grouping of a compute resource 108 and a physical memory 110 of host system 100 that exhibits the property of "non-uniform memory access," which means the compute resource is able access its local memory (i.e., the physical memory of its NUMA node) faster—or in other words, with lower latency—than remote memories (i.e., the physical memories of other NUMA nodes).

For example, FIG. 1B illustrates a particular configuration of host system 100 that includes two NUMA nodes 0 and 1 (reference numerals 106(1) and 106(2)). As shown in FIG. 1B, NUMA node 0 comprises a CPU socket 108(1) and a DRAM 110(1) that is directly attached to CPU socket 108(1) via one or more memory channels 112(1), and NUMA node 1 comprises a CPU socket 108(2) and a DRAM 110(2) that is directly attached to CPU socket 108(2) via one or more memory channels 112(2). CPU socket 108(1) and DRAM 110(1) are grouped into the same NUMA node because CPU socket 108(1) can access directly attached DRAM 110(1) with lower latency than DRAM 110(2) (which requires traversal over a CPU socket interconnect 114). Similarly, CPU socket 108(2) and DRAM 110(2) are grouped into the same NUMA node because CPU socket 108(2) can access directly attached DRAM 110(2) with lower latency than DRAM 110(1) (which requires traversal over that same CPU socket interconnect 114).

Figure 2A:
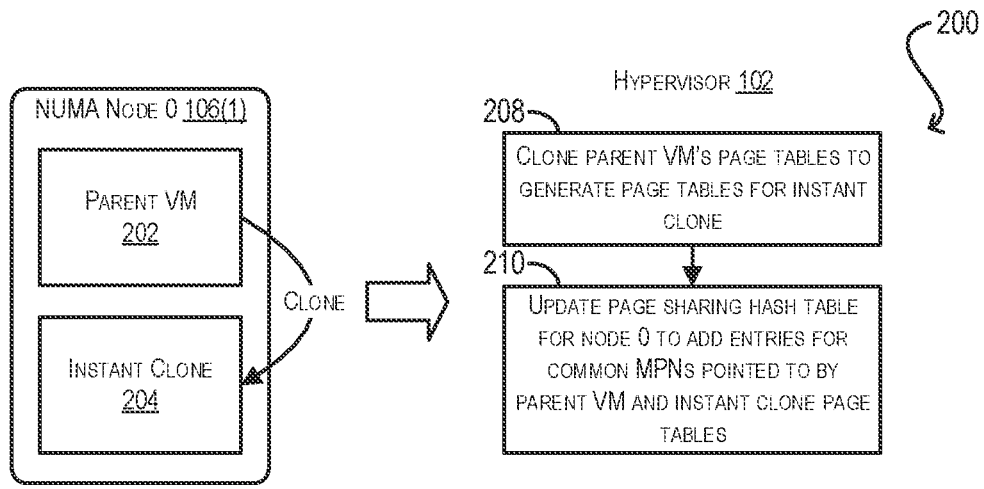
FIGS. 2A and 2B depict two instant cloning workflows.
Figure 2B:
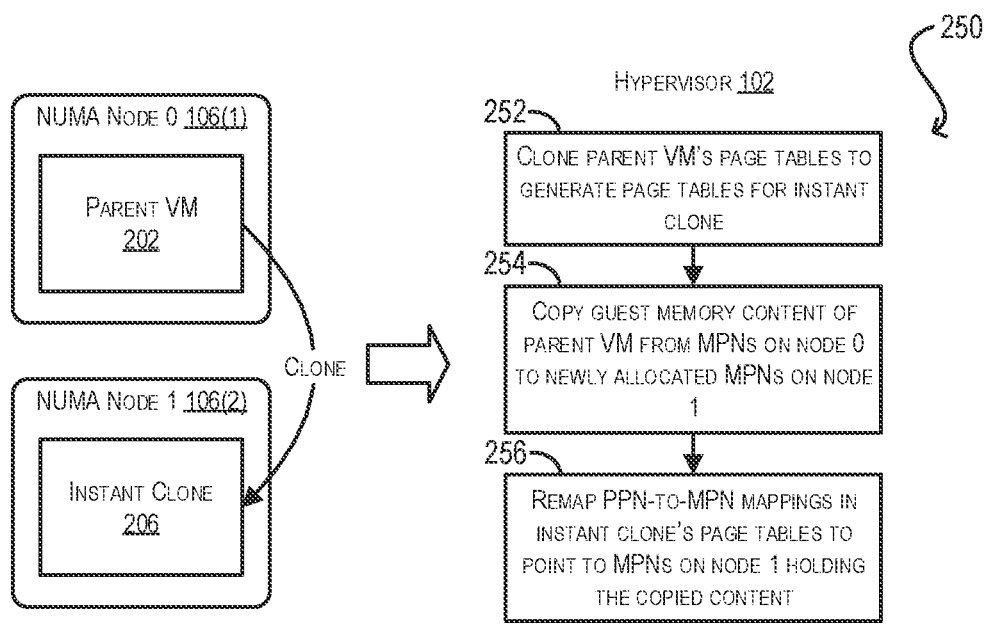

As mentioned previously, existing hypervisors that support NUMA-enabled host systems like host system 100 are generally configured to place a VM on single NUMA node (i.e., the VM's home node) at the time of the VM's creation and disable page sharing across NUMA nodes. While these conditions are beneficial for VM memory locality, they also raise problems in the context of instant cloning. To illustrate this, FIGS. 2A and 2B depict two instant cloning scenarios that involve a parent VM 202 created/placed on NUMA node 0 of host system 100. In particular, FIG. 2A depicts a scenario 200 in which an instant clone 204 of parent VM 202 is created and placed on the same NUMA node 0 as parent VM 202, and FIG. 2B depicts a scenario 250 in which an instant clone 206 of parent VM 202 is created and placed on the other NUMA node 1. In these scenarios, it is assumed that hypervisor 102 of host system 100 maintains a set of page tables for parent VM 202 comprising the parent VM's PPN-to-MPN mappings and all of these mappings specify MPNs in NUMA node 0 (because node 0 is the home node of parent VM 202).

As shown in scenario 200 of FIG. 2A, the process of creating and placing instant clone 204 on NUMA node 0 involves, by hypervisor 102: (1) cloning parent VM 202's page tables to generate a corresponding set of page tables for instant clone 204, thereby causing instant clone 204 and parent VM 202 to point to a common set of MPNs on node 0 (step 208), and (2) updating a page sharing hash table associated with node 0 to add entries for these common MPNs, thereby recording the MPNs as being shared by instant clone 204 and parent VM 202 (step 210).

In contrast, in scenario 250 of FIG. 2A, the process of creating and placing instant clone 206 on NUMA node 1 involves, by hypervisor 102: (1) cloning parent VM 202's page tables to generate a corresponding set of page tables for instant clone 206, thereby causing instant clone 206 and parent VM 202 to point to a common set of MPNs on node 0 (step 252), (2) copying the guest memory content of parent VM 202 from the MPNs on node 0 to newly allocated MPNs on node 1 (because instant clone 206 cannot share the MPNs on node 0 per the restriction on cross-node page sharing noted above) (step 254), and (3) remapping the PPN-to-MPN mappings in instant clone 206's page tables to point to the MPNs on node 1 holding the copied guest memory content (step 256). Accordingly, the end result of steps 252-256 is that an entirely separate copy of parent VM 202's guest memory content is created on NUMA node 1 for use by instant clone 206, which is a problematic outcome. For example, if additional instant clones of parent VM 202 are subsequently created and placed on NUMA node 1 (or any other NUMA node of host system 100 that is not node 0), additional copies of parent VM 202's guest memory content will be created for each of those additional instant clones on their respective home nodes, potentially leading to an unmanageable increase in host physical memory consumption.

To address the foregoing and other similar problems, the following sections of the present disclosure present four approaches that may be implemented by hypervisor 102 for increasing the degree of page sharing on host system 100 in scenarios similar to FIG. 2B—namely, scenarios where a parent VM is created/placed on a first NUMA node of the host system (e.g., NUMA node X) and one or more instant clones of that parent VM are created/placed on a second NUMA node of the host system (e.g., NUMA node Y) that is different from the first NUMA node. Hypervisor 102 may implement these approaches individually or in various combinations.

According to the first approach (referred to as "parent VM replication" and detailed in section (3) below), hypervisor 102 can replicate the parent VM (or more precisely, the guest memory content of the parent VM) from NUMA node X to NUMA node Y, as well as to any other NUMA node in host system 100. This replication may occur when the parent VM is first created and placed on NUMA node X or at some later point in time. With these parent VM replicas in place, when an instant clone of the parent VM is designated to be created/placed on NUMA node Y, hypervisor 102 can create the instant clone using the parent VM replica locally available on node Y, rather than the original parent VM residing on node X. This enables the instant clone to share the guest memory content of the local parent VM replica, regardless of any restrictions on cross-node page sharing, because all of the MPNs holding that content will reside on the instant clone's home node Y.

According to the second approach (referred to as "instant clone copy optimization" and detailed in section (4) below), hypervisor 102 can, at the time a first instant clone is created/placed on NUMA node Y, copy the guest memory content of the parent VM from node X to node Y for use by the first instant clone in a manner similar to steps 252-256 of FIG. 2B. However, hypervisor 102 can also add, to the page sharing hash table associated with NUMA node Y, entries identifying the MPNs on node Y that hold the copied content. Then, when a second (or later) instant clone of the parent VM is created/placed on NUMA node Y, hypervisor 102 can recognize that the parent VM's guest memory content already exists on node Y—per the entries added to node Y's page sharing hash table—and immediately remap the PPN-to-MPN mappings in the second instant clone's page tables to point to (i.e., share) the local MPNs holding that content. In this way, hypervisor 102 can avoid creating an additional copy of the parent VM's guest memory content on NUMA node Y for the second instant clone (as well as for any subsequent instant clones created on node Y).

According to the third approach (referred to as "latency-based cross-node page sharing" and detailed in section (5) below), hypervisor 102 can selectively enable page sharing across certain NUMA nodes of host system 102 (such as between NUMA nodes X and Y) that exhibit a relatively low variance between their respective local and remote memory access latencies (e.g., a difference of 10% or less). Examples of NUMA nodes that may exhibit low latency variance are nodes that are partitioned from a single physical CPU socket via a hardware-based NUMA partitioning feature such as AMD's NUMA Nodes Per Socket (NPS) or Intel's Sub-NUMA Clustering (SNC)/Cluster on Die (CoD). By enabling page sharing across these types of NUMA nodes, hypervisor 102 can potentially sidestep the instant cloning problems described above (and thus conserve host physical memory), without significantly impacting VM memory performance.

And according to the fourth approach (referred to as "cross-node page sharing with heat-based page copying" and detailed in section (6) below), hypervisor 102 can enable page sharing across NUMA nodes X and Y (as well as across all other NUMA nodes of host system 100). This will allow an instant clone that is created on NUMA node Y to directly share, with the parent VM on NUMA node X, MPNs that reside on node X. However, to mitigate the performance impact of this cross-node page sharing, hypervisor 102 can additionally monitor the memory access patterns of the instant clone during its runtime and, through this monitoring, periodically identify "hot" PPNs that are frequently accessed by the instant clone. Hypervisor 102 can then copy, from corresponding MPNs on NUMA node X, the contents of the identified hot PPNs to newly allocated MPNs on NUMA node Y, update the PPN-to-MPN mappings of the instant clone to point to the newly allocated MPNs on Y, and add entries for those MPNs to Y's page sharing hash table. In this way, hypervisor 102 can maximize the memory locality of the hot memory pages and thereby improve the instant clone's performance. For any PPNs that hypervisor 102 does not identify as being hot, the corresponding MPNs will remain on NUMA node X (and thus the instant clone will continue to access those pages remotely), but because such pages are not accessed frequently the performance impact of that remote access will be relatively small.

With the increased page sharing achieved via these four approaches, the issues arising out of placing instant clones on NUMA nodes that are different from their parent VMs (due to, e.g., a lack of available compute or memory resources on the parent VMs' home nodes) can be mostly mitigated/avoided. In certain embodiments, this can also allow hypervisor 102 to flexibly place instant clones on any NUMA node of host system 100 at the time of their creation, without regard to the placement of their parent VMs, which can lead to further benefits such as improved load balancing across NUMA nodes.

It should be appreciated that FIGS. 1A, 1B, 2A, and 2B are illustrative and not intended to limit embodiments of the present disclosure. For example, although FIG. 1B depicts a particular configuration of host system 100 in which the memory resource of each NUMA node 0/1 is DRAM, the embodiments described herein are equally applicable to NUMA nodes comprising persistent memory (PMEM) as their local memory, in lieu of (or in addition to) DRAM. One of ordinary skill in the art will recognize other variations, modifications, and alternatives.

3. Parent VM Replication

Figure 3:
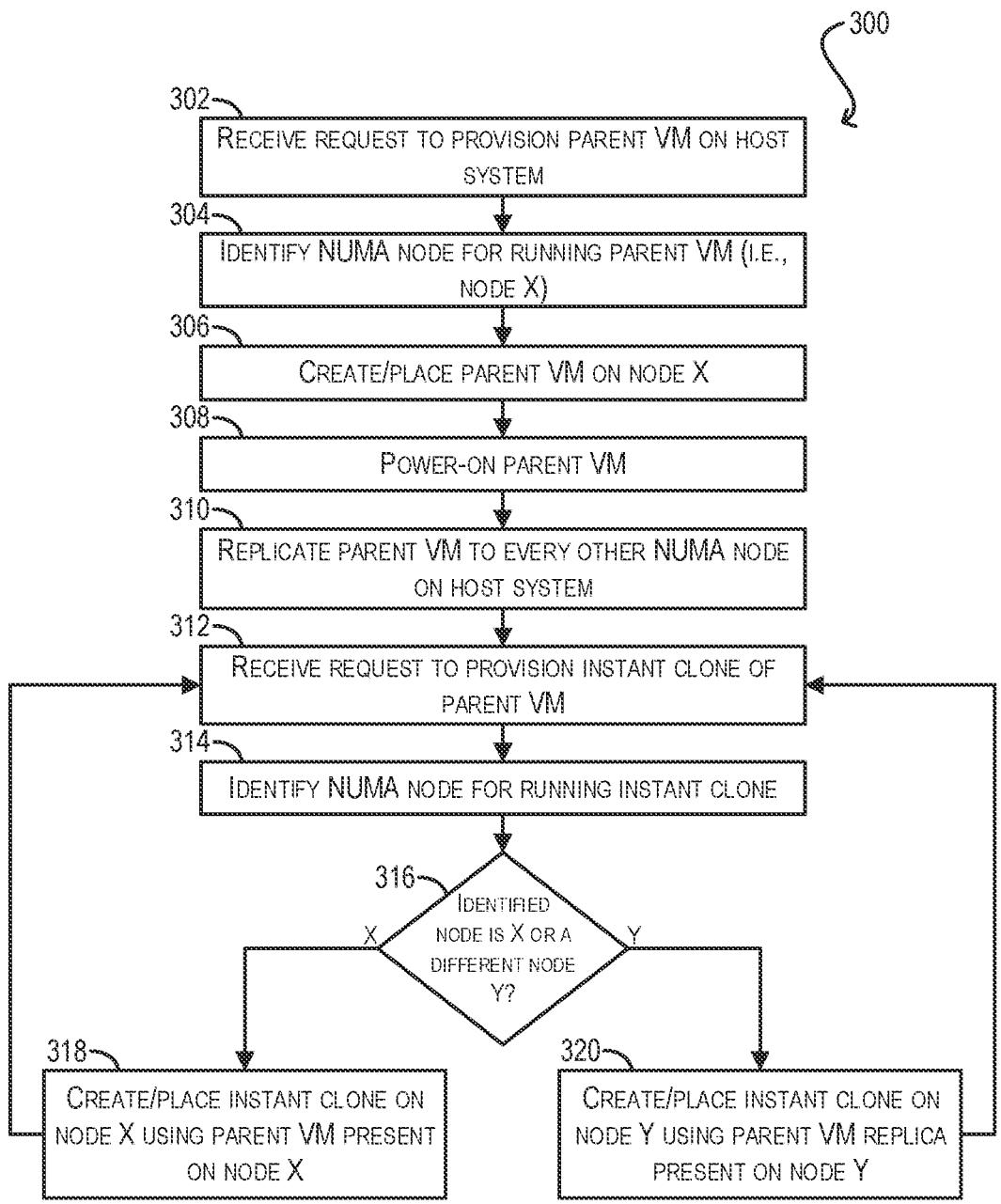
FIG. 3 depicts a flowchart for implementing a first approach for increasing page sharing according to certain embodiments.

FIG. 3 is a flowchart 300 that illustrates steps that may be performed by hypervisor 102 of host system 100 for implementing parent VM replication according to certain embodiments.

Starting with step 302, hypervisor 102 can receive a request to provision (i.e., create) a parent VM on host system 100 for instant cloning purposes. This request may be received from, e.g., a virtualization infrastructure control plane server configured to manage host system 100 and other host systems that are part of the same host cluster.

At steps 304-308, hypervisor 102 can identify an appropriate NUMA node of host system 100 for running the parent VM (i.e., NUMA node X), create/place the parent VM on NUMA node X, and power-on the parent VM. Hypervisor 102 can then replicate the parent VM to every other NUMA node on host system 100 (step 310). This step of replicating the parent VM can comprise copying the guest memory content of the parent VM from the physical memory of NUMA node X to the physical memories of every other NUMA node.

At some later point in time, hypervisor 102 can receive a request to provision an instant clone of the parent VM on host system 100 (step 312). In response, hypervisor 102 can identify a NUMA node of host system 100 for running the instant clone (step 314) and check whether the identified NUMA node is NUMA node X (i.e., the parent VM's home node) or a different NUMA node Y (step 316). If the identified NUMA node is NUMA node X, hypervisor 102 can create/place the instant clone on node X using the parent VM present on that node via processing similar to steps 208 and 210 of FIG. 2A (step 318) and return to step 312 in order to receive and handle the next instant clone provisioning request.

However, if hypervisor 102 determines at step 316 that the identified NUMA node is a different NUMA node Y, hypervisor 102 can create/place the instant clone on node Y using the replica of the parent VM present on node Y, rather than using the original parent VM present on NUMA node X (step 320). This process of creating the instant clone using the parent VM replica on NUMA node Y can include, e.g., cloning the page tables of the parent VM replica in order to generate a corresponding set of page tables for the instant clone. Note that because the parent VM replica's page tables will include PPN-to-MPN mappings that point to MPNs residing on NUMA node Y, the instant clone will be able to share those local MPNs without issue.

Finally, upon creating/placing the instant clone on NUMA node Y via the parent VM replica, hypervisor 102 can return to step 312 in order to receive and handle the next instant clone provisioning request.

4. Instant Clone Copy Optimization

Figure 4:
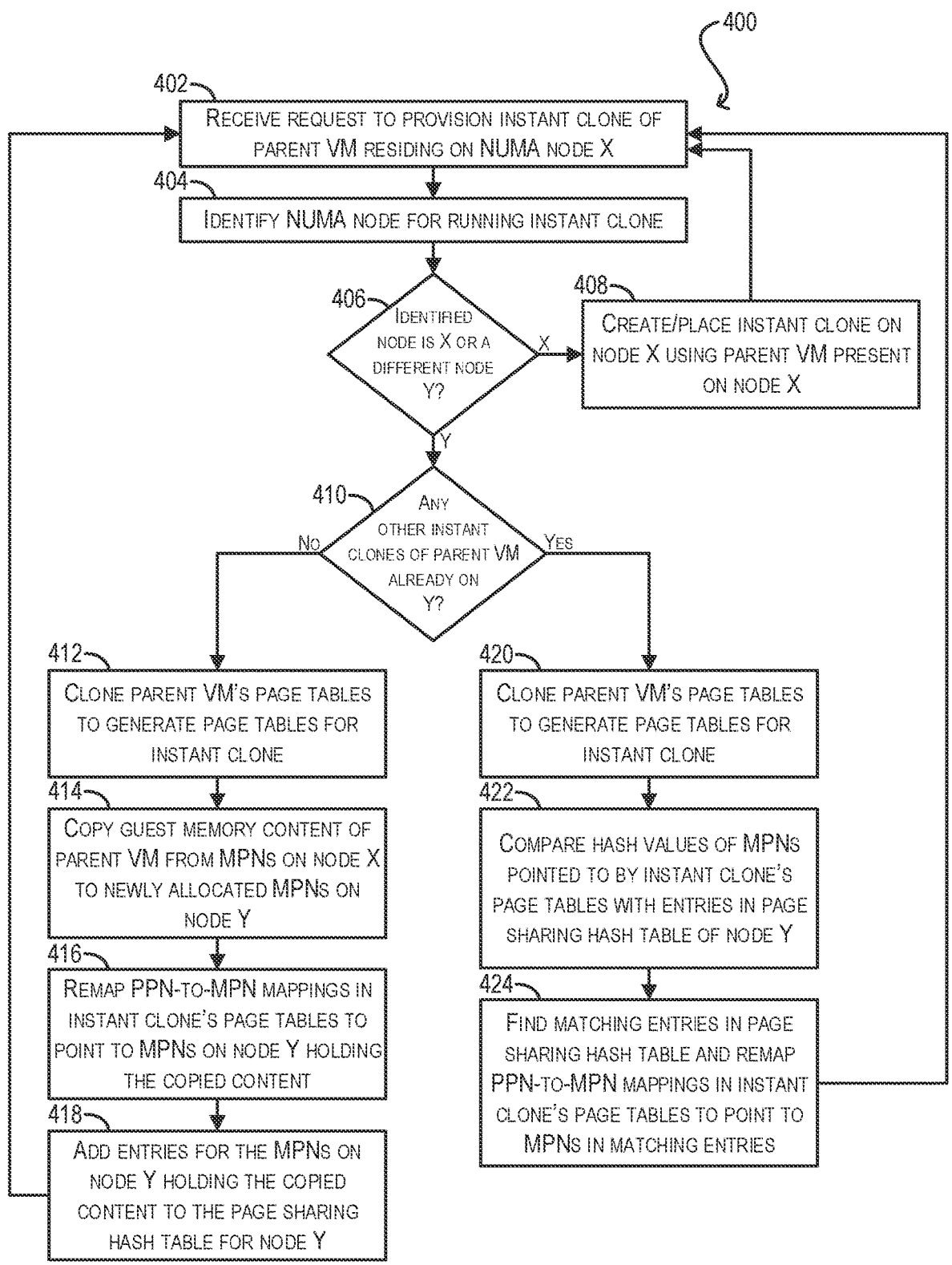
FIG. 4 depicts a flowchart for implementing a second approach for increasing page sharing according to certain embodiments.

FIG. 4 is a flowchart 400 that illustrates steps that may be performed by hypervisor 102 of host system 100 for implementing instant clone copy optimization according to certain embodiments. Flowchart 400 assumes that a parent VM has been created and placed on a single NUMA node X of host system 100.

Starting with step 402, hypervisor can receive a request to provision an instant clone of the parent VM on host system 100. In response, hypervisor 102 can identify a NUMA node of host system 100 for running the instant clone (step 404) and check whether the identified NUMA node is NUMA node X (i.e., the parent VM's home node) or a different NUMA node Y (step 406). If the identified NUMA node is NUMA node X, hypervisor 102 can create/place the instant clone on node X using the parent VM present on that node via processing similar to steps 208 and 210 of FIG. 2A (step 408) and return to step 402 in order to receive and handle the next instant clone provisioning request.

However, if hypervisor 102 determines at step 406 that the identified NUMA node is a different NUMA node Y, hypervisor 102 can further check whether any other instant clones of the parent VM current exist on node Y (step 410). If the answer is no (i.e., this will be the first instant clone of the parent VM on NUMA node Y), hypervisor 102 can clone the parent VM's page tables to generate a corresponding set of page tables for the instant clone (step 412), copy the guest memory content of parent VM from NUMA node X to newly allocated MPNs on NUMA node Y (step 414), and remap the PPN-to-MPN mappings in the instant clone's page tables to point to the MPNs on node Y holding the copied guest memory content (step 416).

In addition, at step 418, hypervisor 102 can add entries for the MPNs on NUMA node Y that hold the copied content to the page sharing hash table associated with node Y, thereby recording "sharing hints" that the content of these MPNs are present on node Y. Hypervisor 102 can thereafter return to step 402 in order to receive and handle the next instant clone provisioning request.

Returning now to step 410, if hypervisor 102 determines that one or more instant clones of the parent VM already exist on NUMA node Y, hypervisor 102 can clone the parent VM's page tables to generate a corresponding set of page tables for the instant clone (step 420) and compare the hash value of each MPN pointed to by its page tables with the entries in the page sharing hash table of node Y (step 422). This will cause the hypervisor 102 find a matching entry in the page sharing hash table for each MPN (because the hash table was updated with entries corresponding to the content of these MPNs at step 418) and remap the mappings in the instant clone's page tables to point to the MPNs identified in the matched hash table entries (which are MPNs residing on NUMA node Y) (step 424). In this way, hypervisor 102 can enable the instant clone to share the MPNs on NUMA node Y that were previously copied over from NUMA node X at the time of creating and placing the first instant clone on node Y. Finally, upon completing the remapping at step 424, hypervisor 102 can return to step 402 in order to receive and handle the next instant clone provisioning request.

It should be noted that certain optimizations to flowchart 400 are possible. For example, in one set of embodiments hypervisor 102 can check, prior to the copying at step 414, whether there are any instant clones of the parent VM present on the parent VM's home node X. If the answer is yes, hypervisor 102 can proceed to step 414. However, if the answer is no, hypervisor 102 can migrate the parent VM from NUMA node X to NUMA node Y, rather than copying its guest memory content, such that parent VM's home node becomes node Y. Hypervisor 102 can then create the instant clone on NUMA node Y using the migrated copy of the parent VM. This optimization avoids maintaining two separate copies of the parent VM's guest memory content across the two NUMA nodes X and Y in scenarios where the parent VM and the instant clone can be consolidated on a single NUMA node.

5. Latency-Based Cross-Node Page Sharing

Figure 5:
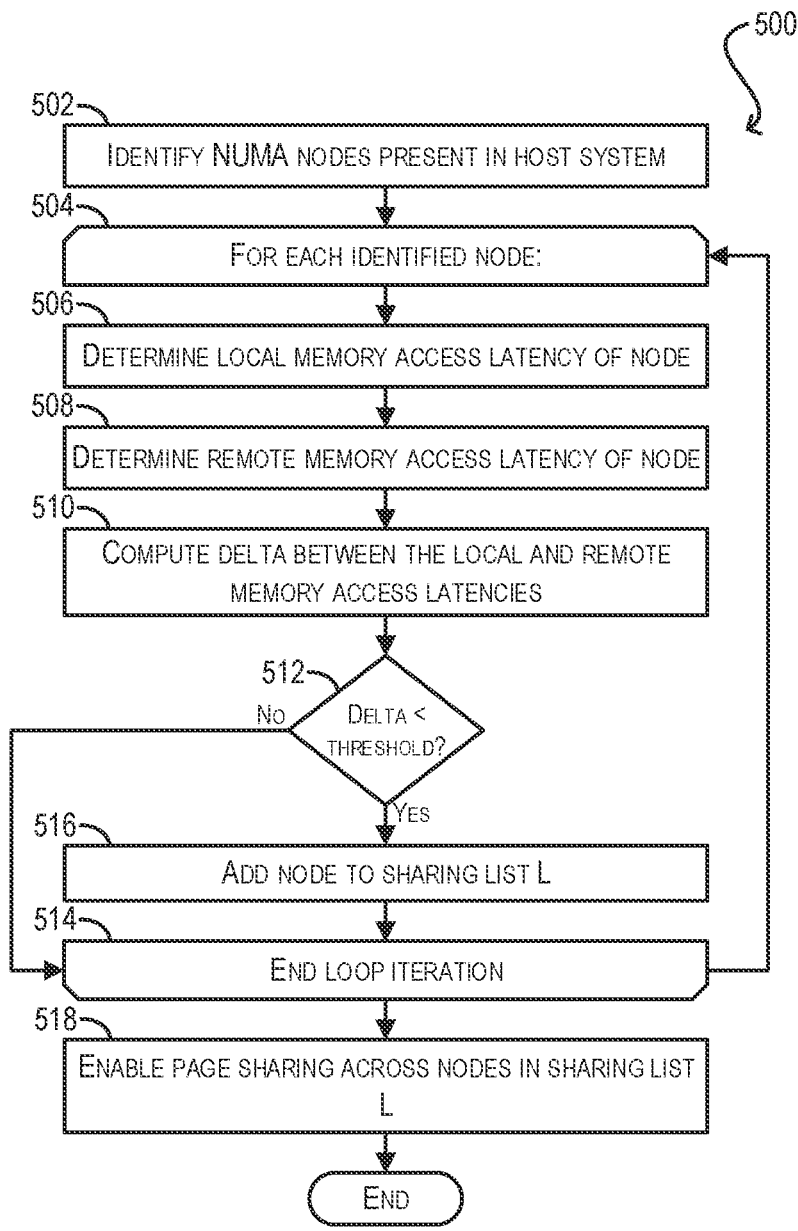
FIG. 5 depicts a flowchart for implementing a third approach for increasing page sharing according to certain embodiments.

FIG. 5 is a flowchart 500 that illustrates steps that may be performed by hypervisor 102 of host system 100 for implementing latency-based cross-node page sharing according to certain embodiments. In a particular embodiment, hypervisor 102 may carry out flowchart 500 as part of the boot sequence of host system 100.

Starting with step 502, hypervisor 102 can identify the NUMA nodes present in host system 100, including the compute resource and physical memory that is part of each NUMA node. Hypervisor 102 may perform this identification via information received from the system firmware of host system 100.

At steps 504-508, hypervisor 102 can, for each identified NUMA node, determine (1) the local memory access latency of that NUMA node (i.e., the latency experienced by the node's compute resource in accessing the node's physical memory) and (2) the remote memory access latency of that NUMA node (i.e., the latency experienced by the node's compute resource in accessing the physical memories of other NUMA nodes). Hypervisor 102 can then compute a delta (in terms of, e.g., percentage) between the local and remote access latencies for the NUMA node (step 510) and check whether this delta is less than a threshold (e.g., 10%) (step 512). If the answer is no (which indicates that the NUMA node's local and remote memory access latencies are substantially different), hypervisor 102 can proceed to the end of the current loop iteration (step 514).

However, if the answer at step 512 is yes (which indicates that the NUMA node's local and remote memory access latencies are substantially uniform and thus the performance hit of enabling cross-node page sharing for this node would be relatively small), hypervisor 102 can add the NUMA node to a sharing list L (step 516) before proceeding to the end of the current loop iteration. As mentioned previously, the types of NUMA nodes that may have a small delta between their local and remote memory access latencies include NUMA nodes that are partitioned from a single physical CPU socket, such as those defined via the NPS and SNC/CoD features provided on AMD and Intel CPU platforms respectively.

Once all of the identified NUMA nodes have been processed, hypervisor 102 can enable cross-node page sharing across the NUMA nodes included in sharing list L (step 518). This can involve, e.g., associating all of the NUMA nodes in sharing list L with a single page sharing hash table T, where table T is capable of holding entries for MPNs that reside on any of the NUMA nodes in L. One consequence of this step is that if sharing list L includes a parent VM home node X and another NUMA node Y and an instant clone of the parent VM is created/placed on node Y, the creation/placement of the instant clone will not cause a copy of the parent VM's guest memory content to be created on node Y; instead, the instant clone will remotely share the MPNs holding that content on NUMA node X.

Finally, upon enabling cross-node page sharing for the NUMA nodes in sharing list L per step 518, flowchart 500 can end.

6. Cross-Node Page Sharing with Heat-Based Page Copying

Figure 6:
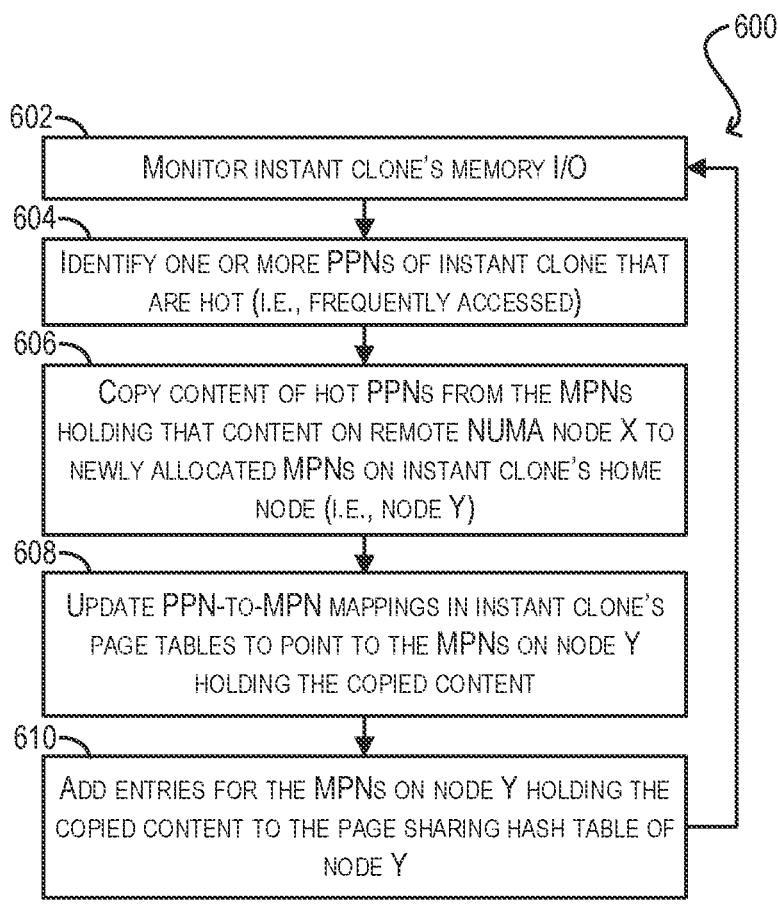
FIG. 6 depicts a flowchart for implementing a fourth approach for increasing page sharing according to certain embodiments.

FIG. 6 is a flowchart 600 that illustrates steps that may be performed by hypervisor 102 of host system 100 for implementing cross-node page sharing with heat-based page copying according to certain embodiments. Flowchart 600 assumes that cross-node page sharing has been enabled between a NUMA node X of host system 100 that is the home node for a parent VM and a NUMA node Y of host system 100 that is the home node of an instant clone of the parent VM, and thus the instant clone is configured to remotely access MPNs on node X holding the guest memory content of the parent VM.

Starting with steps 602 and 604, hypervisor 102 can monitor the instant clone's memory I/O during the instant clone's runtime and, via this monitoring, identify one or more PPNs of the instant clone that are "hot" (i.e., frequently accessed by the instant clone). The specific manner in which hypervisor 102 performs this monitoring and the specific threshold used identify hot versus cold PPNs can differ depending on the implementation.

At step 606, hypervisor 102 can copy the content of the hot PPNs identified at step 604 from the MPNs holding that content on NUMA node X to newly allocated MPNs on NUMA node Y (i.e., the instant clone's home node). Hypervisor 102 can then update the PPN-to-MPN mappings in the instant clone's page tables to point to the MPNs on NUMA node Y that hold the copied content, thereby enabling the instant clone to access that content locally rather than remotely (step 608). Hypervisor 102 can also add entries for those MPNs on NUMA node Y to the shared page hash table of node Y, which allows any additional instant clones created and placed on node Y to share them (step 610).

Finally, hypervisor 102 can return to step 602 in order to continue its monitoring of the instant clone and copy over additional hot memory pages from NUMA node X to NUMA node Y as needed.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless of the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   determining, by a hypervisor of a host system, that a delta between local and remote memory access latencies for each of a subset of non-uniform memory access (NUMA) nodes of the host system is less than a threshold; and
   in response to the determining, enabling, by the hypervisor, page sharing across the subset of NUMA nodes, wherein the enabling comprises associating the subset of NUMA nodes with a single page sharing table, and wherein the single page sharing table holds entries identifying host physical memory pages of the host system that are shared by virtual machines (VMs) placed on the subset of NUMA nodes.

2. The method of claim 1 further comprising:
   maintaining a copy of a parent VM on every NUMA node of the host system; and
   at a time of creating an instant clone of the parent VM on a first NUMA node of the host system, creating the instant clone from the copy of the parent VM maintained on the first NUMA node, the creating causing the instant clone to share one or more host physical memory pages with the copy of the parent VM maintained on the first NUMA node.

3. The method of claim 1 further comprising:
   maintaining a parent VM on a first NUMA node of the host system;
   receiving a request to provision an instant clone of the parent VM on the host system;
   determining that the instant clone should be placed on a second NUMA node of the host system that is different from the first NUMA node; and checking whether another instant clone of the parent VM exists on the second NUMA node.

4. The method of claim 3 further comprising, upon determining that another instant clone of the parent VM does not exist on the second NUMA node:
    copying a set of host physical memory pages mapped to guest physical memory of the parent VM from the first NUMA node to the second NUMA node, the copying resulting in a set of copied host physical memory pages on the second NUMA node;
    mapping guest physical memory of the instant clone to the set of copied host physical memory pages; and
    adding entries for the set of copied host physical memory pages to a page sharing table associated with the second NUMA node.

5. The method of claim 4 further comprising, upon determining that another instant clone of the parent VM exists on the second NUMA node:
    determining, via the page sharing table associated with the second NUMA node, that the set of copied host physical memory pages on the second NUMA node correspond to the guest physical memory of the parent VM; and
    in response to the determining, mapping the guest physical memory of the instant clone to the set of copied host physical memory pages.

6. The method of claim 4 further comprising, prior to copying the host physical memory pages mapped to the guest physical memory of the parent VM from the first NUMA node to the second NUMA node:
    determining that yet another instant clone of the parent VM exists on the first NUMA node; and
    in response to the determining, migrating, rather than copying, the host physical memory pages mapped to the guest physical memory of the parent VM from the first NUMA node to the second NUMA node.

7. The method of claim 1 further comprising:
    creating an instant clone of a parent VM on a first NUMA node in the subset of NUMA nodes, the parent VM being maintained on a second NUMA node in the subset of NUMA nodes;
    identifying a guest physical memory page of the instant clone that is being frequently accessed during runtime of the instant clone; and
    copying, from the first NUMA node to the second NUMA node, a host physical memory page on the first NUMA node that is mapped to the guest physical memory page, the copying resulting in a copied host physical memory page on the second NUMA node; and
    mapping the guest physical memory page of the instant clone to the copied host physical memory page on the second NUMA node.

8. A non-transitory computer readable storage medium having stored thereon program code executable by a hypervisor of a host system, the program code embodying a method comprising:
    determining that a delta between local and remote memory access latencies for each of a subset of non-uniform memory access (NUMA) nodes of the host system is less than a threshold; and
    in response to the determining, enabling page sharing across the subset of NUMA nodes, wherein the enabling comprises associating the subset of NUMA nodes with a single page sharing table, and wherein the single page sharing table holds entries identifying host physical memory pages of the host system that are shared by virtual machines (VMs) placed on the subset of NUMA nodes.

9. The non-transitory computer readable storage medium of claim 8 wherein the method further comprises:
    maintaining a copy of a parent VM on every NUMA node of the host system; and
    at a time of creating an instant clone of the parent VM on a first NUMA node of the host system, creating the instant clone from the copy of the parent VM maintained on the first NUMA node, the creating causing the instant clone to share one or more host physical memory pages with the copy of the parent VM maintained on the first NUMA node.

10. The non-transitory computer readable storage medium of claim 8 wherein the method further comprises:
    maintaining a parent VM on a first NUMA node of the host system;
    receiving a request to provision an instant clone of the parent VM on the host system;
    determining that the instant clone should be placed on a second NUMA node of the host system that is different from the first NUMA node; and
    checking whether another instant clone of the parent VM exists on the second NUMA node.

11. The non-transitory computer readable storage medium of claim 10 wherein the method further comprises, upon determining that another instant clone of the parent VM does not exist on the second NUMA node:
    copying a set of host physical memory pages mapped to guest physical memory of the parent VM from the first NUMA node to the second NUMA node, the copying resulting in a set of copied host physical memory pages on the second NUMA node;
    mapping guest physical memory of the instant clone to the set of copied host physical memory pages; and
    adding entries for the set of copied host physical memory pages to a page sharing table associated with the second NUMA node.

12. The non-transitory computer readable storage medium of claim 11 wherein the method further comprises, upon determining that another instant clone of the parent VM exists on the second NUMA node:
    determining, via the page sharing table associated with the second NUMA node, that the set of copied host physical memory pages on the second NUMA node correspond to the guest physical memory of the parent VM; and
    in response to the determining, mapping the guest physical memory of the instant clone to the set of copied host physical memory pages.

13. The non-transitory computer readable storage medium of claim 11 wherein the method further comprises, prior to copying the host physical memory pages mapped to the guest physical memory of the parent VM from the first NUMA node to the second NUMA node:
    determining that yet another instant clone of the parent VM exists on the first NUMA node; and
    in response to the determining, migrating, rather than copying, the host physical memory pages mapped to the guest physical memory of the parent VM from the first NUMA node to the second NUMA node.

14. The non-transitory computer readable storage medium of claim 8 wherein the method further comprises:

creating an instant clone of a parent VM on a first NUMA node in the subset of NUMA nodes, the parent VM being maintained on a second NUMA node in the subset of NUMA nodes;

identifying a guest physical memory page of the instant clone that is being frequently accessed during runtime of the instant clone; and copying, from the first NUMA node to the second NUMA node, a host physical memory page on the first NUMA node that is mapped to the guest physical memory page, the copying resulting in a copied host physical memory page on the second NUMA node; and mapping the guest physical memory page of the instant clone to the copied host physical memory page on the second NUMA node.

15. A host system comprising:
a hypervisor;
a plurality of non-uniform memory access (NUMA); and
a non-transitory computer readable medium having stored thereon program code that causes the hypervisor to:
   determine that a delta between local and remote memory access latencies for each of a subset of the plurality of NUMA nodes is less than a threshold; and
   in response to the determining, enable page sharing across the subset of NUMA nodes, wherein the enabling comprises associating the subset of NUMA nodes with a single page sharing table, and wherein the single page sharing table holds entries identifying host physical memory pages of the host system that are shared by virtual machines (VMs) placed on the subset of NUMA nodes.

16. The host system of claim 15 wherein the program code further causes the hypervisor to:
   maintain a copy of a parent VM on every NUMA node in the plurality of NUMA nodes; and
   at a time of creating an instant clone of the parent VM on a first NUMA node in the plurality of NUMA nodes, create the instant clone from the copy of the parent VM maintained on the first NUMA node, the creating causing the instant clone to share one or more host physical memory pages with the copy of the parent VM maintained on the first NUMA node.

17. The host system of claim 15 wherein the program code further causes the hypervisor to:
   maintain a parent VM on a first NUMA node in the plurality of NUMA nodes;
   receive a request to provision an instant clone of the parent VM on the host system;
   determine that the instant clone should be placed on a second NUMA node in the plurality of NUMA nodes that is different from the first NUMA node; and
   check whether another instant clone of the parent VM exists on the second NUMA node.

18. The host system of claim 17 wherein the program code further causes the hypervisor to, upon determining that another instant clone of the parent VM does not exist on the second NUMA node:
   copy a set of host physical memory pages mapped to guest physical memory of the parent VM from the first NUMA node to the second NUMA node, the copying resulting in a set of copied host physical memory pages on the second NUMA node;
   map guest physical memory of the instant clone to the set of copied host physical memory pages; and
   add entries for the set of copied host physical memory pages to a page sharing table associated with the second NUMA node.

19. The host system of claim 18 wherein the program code further causes the hypervisor to, upon determining that another instant clone of the parent VM exists on the second NUMA node:
   determine, via the page sharing table associated with the second NUMA node, that the set of copied host physical memory pages on the second NUMA node correspond to the guest physical memory of the parent VM; and
   in response to the determining, map the guest physical memory of the instant clone to the set of copied host physical memory pages.

20. The host system of claim 18 wherein the program code further causes the hypervisor to, prior to copying the host physical memory pages mapped to the guest physical memory of the parent VM from the first NUMA node to the second NUMA node:
   determine that yet another instant clone of the parent VM exists on the first NUMA node; and
   in response to the determining, migrate, rather than copy, the host physical memory pages mapped to the guest physical memory of the parent VM from the first NUMA node to the second NUMA node.

21. The host system of claim 15 wherein the program code further causes the hypervisor to:
   create an instant clone of a parent VM on a first NUMA node in the subset of NUMA nodes, the parent VM being maintained on a second NUMA node in the subset of NUMA nodes;
   identify a guest physical memory page of the instant clone that is being frequently accessed during runtime of the instant clone; and
   copy, from the first NUMA node to the second NUMA node, a host physical memory page on the first NUMA node that is mapped to the guest physical memory page, the copying resulting in a copied host physical memory page on the second NUMA node; and
   map the guest physical memory page of the instant clone to the copied host physical memory page on the second NUMA node.

* * * * *